(No Model.)
E. J. J. DE BAILLEHACHE.
ELECTRIC TRAIN SIGNALING APPARATUS FOR RAILWAYS.
No. 427,953. Patented May 13, 1890.
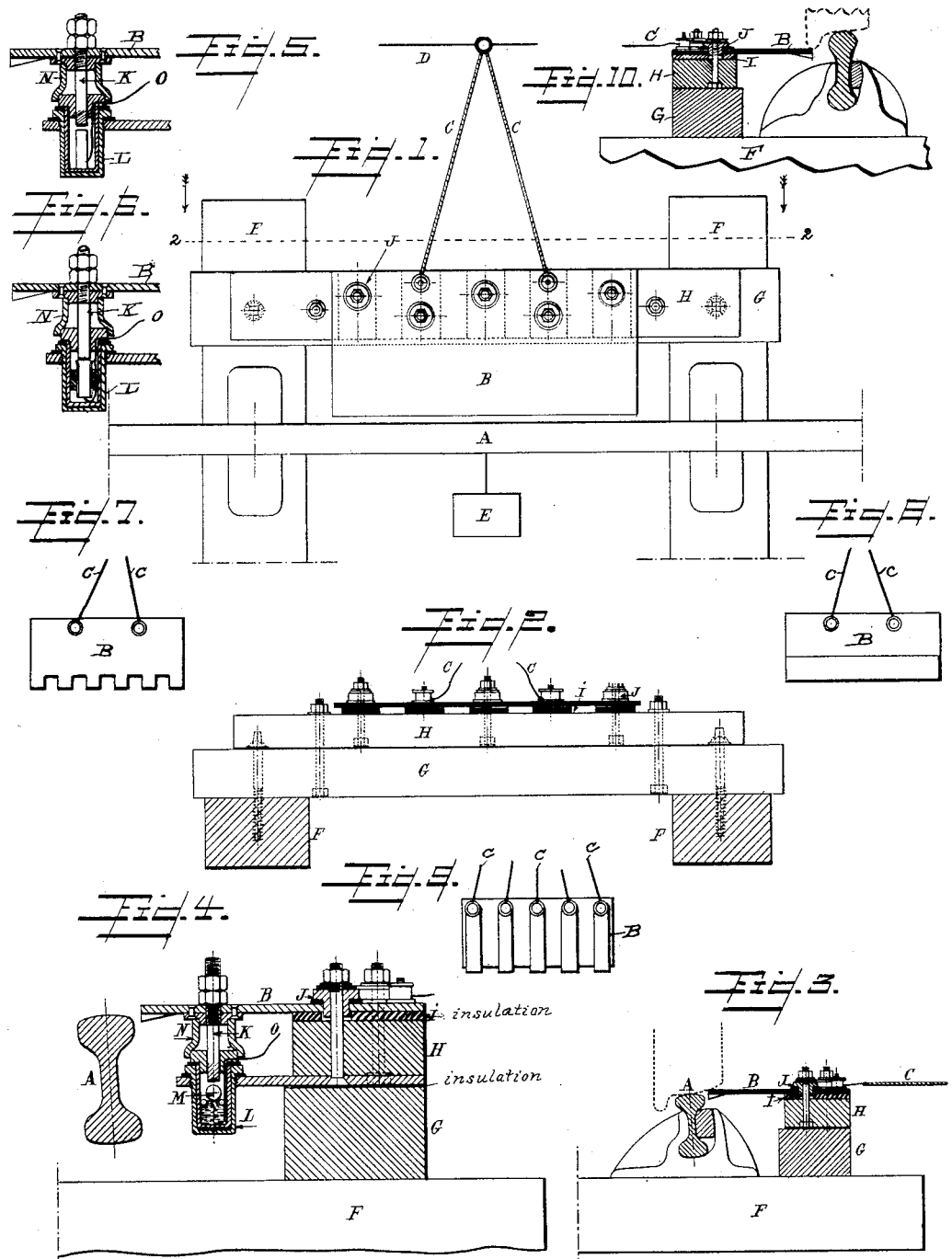

UNITED STATES PATENT OFFICE.

EUGÈNE JACQUES JÉRÔME DE BAILLEHACHE, OF PARIS, FRANCE.

ELECTRIC TRAIN-SIGNALING APPARATUS FOR RAILWAYS.

SPECIFICATION forming part of Letters Patent No. 427,953, dated May 13, 1890.

Application filed February 21, 1889. Serial No. 300,667. (No model.)

*To all whom it may concern:*

Be it known that I, EUGÈNE JACQUES JÉRÔME DE BAILLEHACHE, a citizen of the Republic of France, and a resident of Paris, in the said Republic, have invented certain new and useful Improvements in Electric Train-Signaling Apparatus for Railways, of which the following is a specification.

This invention has for its object a simple and practical signaling appliance or apparatus, whereby a railway-train is caused, by means of electricity, to signal its approach to a station more or less distant as it passes a given point on the road, and even, if desired, to indicate its speed and the number of carriages of which it is composed.

This invention consists, essentially, in the use of a fixed elastic insulated metallic plate or bar above the railway-sleeper and placed at a short distance outside and a little above the rail, so that it will be struck by the tire of the wheels of the train. This insulated plate being in communication with a line-wire, and the rail communicating with the return-line through the earth, the tire of each wheel traveling on the rail closes the circuit and produces the desired signals. The fact of this plate being slightly depressed during the passage of the train may be made use of for the purpose of closing the circuit and making more certain the object to be obtained.

The invention further relates to fixing and insulating the plate or bar aforesaid, and to an appliance for establishing electrical contact, which can be applied with advantage to this kind of apparatus.

Figure 1 is a plan view of my invention. Fig. 2 is a section on line 2 2 of Fig. 1. Fig. 3 is a detail view of the plate and its manner of support. Figs. 4, 5, and 6 show different forms of devices for making contact. Figs. 7, 8, and 9 are detail views of different forms of the plate. Fig. 10 shows the apparatus arranged between the rails.

At the side of the railway-rail A and slightly above its surface is placed a metallic plate B, insulated from the ground and elastically fixed in its supports, as will be described hereinafter. This plate is connected by means of one or more conductors C with a line-wire D in connection with the signaling apparatus at a station, or at any other point at which the electric generator or battery is placed, which supplies the current that returns through the earth. To make sure of the return of the current, the rail A aforesaid is preferably in communication with an earth-plate E or its equivalent. When a train passes over the rail A, the tire of each wheel running over it will strike the metallic plate B, (which is slightly bent down at the ends, so as to avoid all sudden shock,) and will close the circuit by making an electrical connection between the rail A and the plate B.

In order to insure the insulation of the plate B and to enable it to be depressed a certain distance under the action of the tire of the wheels of a train, two long girders or beams G and H are placed one over the other upon two or more consecutive sleepers F, covered with an insulating-coating and preferably separated by a piece of gutta-percha or other insulating material. On the top one H are placed several thick gutta-percha plates I, upon which rests the metallic plate B aforesaid, which is fixed by means of pins or bolts passing through sockets of hard wood to insulate them from the said plate. The width of the metallic plate B is variable, and depends on the length of contact which is required. Spaces may be cut out of the edge, or several plates may be employed in succession in order to increase the number of contacts. On the aforesaid plate a strip of copper might also be placed, which can be insulated from the said plate, and the conducting-wire attached to it, or several strips of copper may be riveted or soldered across the plate and at a suitable distance apart, rising above the latter, so as to be successively struck by the tire of the wheel. The plate B might be placed between the rails and be depressed by the flange of the wheel. In this case the closing of the circuit would be made more certain by the action of the contact-maker, which will be hereinafter explained.

In order to make use of the depression of the flexible plate B for the purpose of closing the circuit, if it is found that the current does not flow through the tire of the wheels of the train, a bolt or pin of conducting metal K, Fig. 4, is arranged on the said plate. When the bolt is depressed, it comes in contact with a contact device communicating with the earth. This contact device may consist simply of a pin similar to the first-mentioned pin K, and fixed vertically opposite the latter on a support communicating with the earth and supported by the lower beam or block aforesaid. It may also have two metallic strips held between plates or washers of gutta-percha, and placed so that the pin, when depressed, will exert a friction on them and so render contact certain. Any equivalent arrangement may be employed with the same object. In any case the two contact-pieces are inclosed in a sheath or tube of gutta-percha to protect them from moisture and dust.

The following special appliance for establishing contact, called "floating contact," may be used with great advantage. It consists of a cup L containing mercury, in which floats an iron ball M, and, if necessary, other small glass or metal balls. The pin K enters the top of this cup, from which it is insulated by a washer of hard wood, through which it passes. A flexible sheath of gutta-percha N surrounds the whole, as above mentioned. When the plate is depressed, the pin K aforesaid strikes the iron ball M and closes the circuit, the mercury being in electrical connection with the earth-plate E by means of a conducting-wire O. The shock imparted by the pin causes all the floating balls to vibrate violently, and their action has the effect of keeping the contact-surfaces always clean, thus making the action of the apparatus more certain. Owing to the electric currents, which are thus caused to flow through the line-wire D when the circuit is closed during the passage of a train, various kinds of signals may be produced, and it is easily seen that not only can the position of the train be determined at a distance, but by observing the duration of the signals and the time occupied by the train in moving between two apparatus fixed at given points or between the apparatus and the station the speed of the train and the number of carriages can be determined.

In cases where it is desirable for the electrical circuit to remain closed and to interrupt it only during the passage of a train over the apparatus the metallic plate B cannot be employed alone, and the contact-pin K, fixed to the said plate B, is so arranged that it will always remain in electrical contact with the opposing contact device, from which it is only separated when the metallic plate B is depressed by the passage of a train.

I am aware that several arrangements of the kind described have already been suggested; but the novel points of the invention will be set forth in the claims annexed hereto. I have myself shown and described a contact-rail for effecting the same object in English Patent dated May 1, 1885, No. 5,404, which was applied for as a communication from me.

I claim as my invention—

1. In a system of electric train-signaling for railways, a plane metallic insulated horizontal plate B, electrically connected with the line-wire, arranged in a plane near the tread of the rail and in such proximity to the rails as to be struck by the tires of the wheels in passing, and a second contact device in communication with the earth and normally out of electrical connection with the plate B, said plate B being elastically secured to the sleepers of the railroad.

2. In a system of electric train-signaling for railways, a plane metallic horizontal plate B, electrically connected with the line-wire, arranged in a plane near the tread of the rails and in such proximity to the rails as to be struck by the tires of the wheels in passing, a second contact device in communication with the earth and normally out of electrical connection with the plate B, plates of insulating material arranged above the sleepers of the road to which said plate B is secured, and fastening devices therefor, substantially as described.

3. In a system of electric train-signaling for railways, a horizontal flexible metallic plate B, electrically connected with the line-wire, arranged in a plane near the tread of the rail and in such proximity to the rails as to be struck by the tires of the wheels in passing and bent downward at the corners so as to avoid any sudden shock, a second contact device in communication with the earth and normally out of electrical connection with the plate B, beams G H, secured to the sleepers of the road and coated with insulating material, gutta-percha plates between the beams and between the top beam and the plate B, and bolts or rivets securing the plate B and insulating-plates in position, said bolts or rivets being provided with washers of insulating material, substantially as described.

4. In a system of electric train-signaling for railways, the combination, with a metallic plate B, fixed elastically on the sleepers of the railroad, of a bolt or pin K, of conducting material, attached to the said plate B, an opposing contact device arranged in the path of the pin K, and a sheath or tube N, surrounding the contact-pin K aforesaid, substantially as described.

5. In a system of electric train-signaling for railways, a device for closing or interrupting the electric circuit during the passage of a train, consisting of a cup L, containing mercury, in which float one or more metallic balls M, and into which penetrates a conducting-pin K, insulated from the cup L aforesaid and attached to the under side of the flexible metallic plate B, against which the wheels of the carriages strike, substantially as described.

In testimony whereof I have signed my name to this specification in the presence of two subscribing witnesses.

EUGÈNE JACQUES JÉRÔME DE BAILLEHACHE.

Witnesses:
EUGÈNE DUMAL,
CHARLES BAILLY.